Dec. 10, 1940.  G. L. ADAMS ET AL  2,224,624
APPARATUS FOR SEPARATING WATER FROM OIL
Filed May 9, 1938
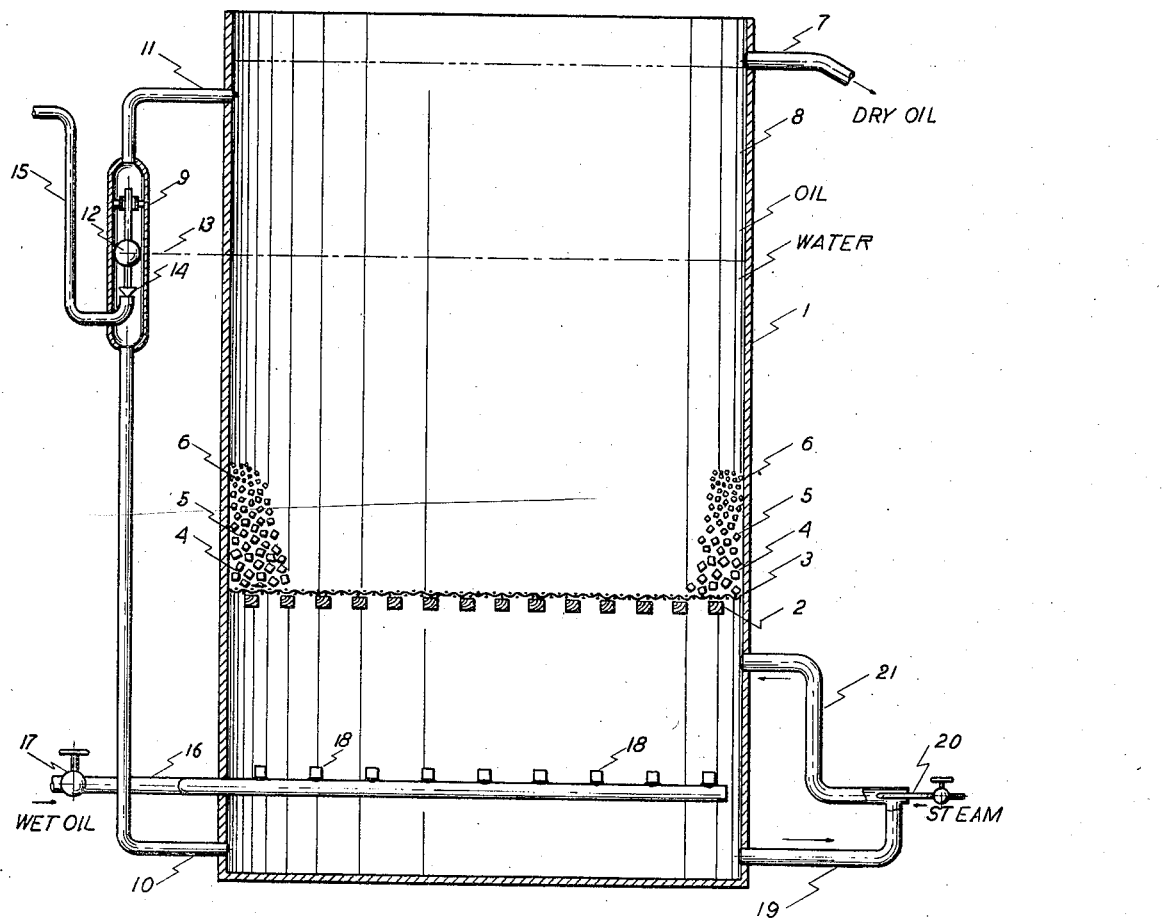
GALE L. ADAMS
ROY G. BARLOW
ABRAHAM SHAPIRO
INVENTORS
ATTORNEY Patented Dec. 10, 1940

2,224,624

UNITED STATES PATENT OFFICE 2,224,624

APPARATUS FOR SEPARATING WATER FROM OIL

Gale L. Adams, Los Angeles, Roy G. Barlow, Whittier, and Abraham Shapiro, Los Angeles, Calif., assignors to Socony-Vacuum Oil Company, Incorporated, New York, N. Y., a corporation of New York Application May 9, 1938, Serial No. 206,762

3 Claims. (Cl. 210—47)

The object of our invention is to provide means and a method for separating water from its intermixtures with heavy and viscous oils. The invention applies to mixtures in which the greater part or all of the water is suspended in the oil in the free form and is little if at all adapted to the resolution of emulsions.

In some oil fields of the Pacfic Coast and elsewhere in the United States, very heavy and viscous oils are produced. At atmospheric temperature these oils often have a specific gravity very closely approaching that of water (15° to 12° A. P. I. being not uncommon) and a very high viscosity.

On raising the temperature of these oils the gravity difference is increased, due to the higher coefficient of expansion of the oil phase, and the viscosity of the oil is materially decreased. In some cases mere heating suffices for the settling and aggregation of the suspended water drops, and at the present time this is substantially the only method of separation in use, but this method has the two drawbacks, first, that in many cases a temperature below the boiling point of water does not suffice to permit the small gravity difference to overcome the surface tension of the water drops and cause them to coalesce, second, that to avoid the generation of steam on highly heated surfaces and its subsequent condensation in the oil body it is necessary to apply heat very gently and at a temperature on the hot side below the boiling point of water under whatever pressure may be carried on the system. These limitations make the step of settling water by heating slow, expensive, and often impracticable.

We have discovered that oils of this character may be substantially completely freed from suspended water in the apparatus and by the procedure hereinbelow described.

Referring to the attached drawing which shows an exemplary form of apparatus in vertical section, 1 is a shell of any convenient form and dimensions, which may be closed or open at the top as preferred. At a medial point in the height we place a grid 2 supporting a wire screen 3. On this screen we place one or more layers (4—5—6) of broken glass screened to certain size ranges. For example a single layer ranging in size from —⅛" mesh to +1/16" mesh may be used, or we may use three or more layers graded upwardly from ¼" mesh to 1/16" mesh. Somewhat more complete separation is effected by this gradation when other conditions are identical. The depth of the layer or layers may be from one to three or more feet, an increase in depth increasing (though not proportionately) the throughput of the apparatus, and also increasing the completeness of separation for any given feed rate.

The shell 1 is provided with an overflow pipe 7 for clean oil, which establishes the upper level of an oil body 8. It is also provided with any constant level device indicated generally at 9 and connected to the vessel by pipes 10 and 11. In the simple form shown the float 12 rises when the water level passes the predetermined level 13 and permits the water removed from the oil to escape through valve 14 and overflow pipe 15. The device shown is conventional and is suggestive only.

It will be noted that the parting line 13 between oil and water is so adjusted as to cause the glass pack to be entirely submerged in the water body. It is not essential to carry the water level so far above the pack as shown in the drawing, but it is essential that it be maintained above the top of the pack to secure the best results, as any part of the pack submerged in oil is inoperative for water separation.

The water-containing oil is introduced into the water body in the bottom of the shell through a pipe 16 controlled by valve 17 and provided with a plurality of upward looking nozzles or orifices 18. This pipe may be a single run or, better, it may be a coil or grid arranged to distribute the feed over the plan area of the vessel. The nozzles or orifices should be of such area as to deliver the oil feed in thin streams but preferably should not introduce it at such velocity as materially to agitate the lower water body.

The water body is maintained at a desired temperature, usually only slightly below the boiling point of water, in any convenient manner as, for example, by steam coils not shown laid on the bottom of the shell. We prefer however to withdraw a stream of water from the lower part of the body through pipe 19 by means of the steam actuated aspirator 20 which returns it in a heated condition through pipe 21 into the upper part of the water body.

In operating the above device the rate of throughput must be kept below the point at which the interstitial water in the glass pack is displaced by oil—in other words, there must be a water body surrounding the glass fragments with which the ruptured water particles may coalesce. While we do not bind ourselves to any theory, we believe that an oil film thinner than the diameter of the smallest water particles is formed on the glass by preferential wetting, and that the adhesion tension thus produced (found by Miller and Bartell to lie between 58 and 72 dynes per square centimeter) literally forces the water particles to coalesce with the continuous water phase existing between the glass particles.

Theory aside, we have proven in experience the necessity for maintaining the continuous water phase within the glass pack, and this is believed to differentiate our process from the prior art filtration methods in which the parting of the phases is effectuated outside of the filter bed.

As an example of the efficiency of the process, a certain California crude of 13° to 14° A. P. I. gravity containing from 10% to 12% of coarsely dispersed water has heretofore been treated by heating to 270° F. under pressure and settling for protracted periods, the water content being thus reduced to 3%. On passing the same crude through the described apparatus in which the temperature of the water body was maintained at 150° to 160° F. and in which the glass body was one foot in thickness, the water content was reduced to 2.5% at a throughput rate equal to 2½ volumes wet crude per hour per gross volume of glass in the pack.

The method above described produces, in fact, no more than an extreme acceleration of the sedimentation of water which is free to settle if granted more time and a higher temperature than that required in our procedure. It is believed that in some cases there is a slight resolution of actual emulsion, but this is apparently unimportant even under favorable conditions and we do not recommend the method for such resolution.

It should be reserved, however, that if the emulsion be broken by other means, so that what was previously an emulsion becomes a suspension of free water, even in a very fine state of subdivision, the process immediately becomes applicable and produces excellent results in the way of rapid and complete parting of the aqueous from the oily phase.

We claim as our invention:

1. Apparatus for separating suspended water from oil, comprising: a container; a layer of fragmental glass horizontally arranged across said container and spaced from the ends thereof; an overflow pipe adjacent the upper end of said container; means for introducing oil containing suspended water into said container below said layer of glass; means for heating a body of water collected in the lower portion of said container; means for the substantially continuous withdrawal of water from a point in said container below said overflow pipe; and means for so controlling said withdrawal of water that a substantially constant water level is maintained above said layer of glass and below said overflow pipe.

2. Apparatus substantially as and for the purpose set forth in claim 1, in which said layer of glass is composed of fragments ranging from ¼" to $\frac{1}{16}$" in diameter.

3. Apparatus substantially as and for the purpose set forth in claim 1, in which said point of water withdrawal is below said layer of glass.

GALE L. ADAMS.
ROY G. BARLOW.
ABRAHAM SHAPIRO.